(12) United States Patent
Brawner

(10) Patent No.: US 10,214,133 B2
(45) Date of Patent: Feb. 26, 2019

(54) REMOVABLE CHOCK

(71) Applicant: Jeffrey Brawner, Tampa, FL (US)

(72) Inventor: Jeffrey Brawner, Tampa, FL (US)

( * ) Notice: Subject to any disclaimer, the term of this patent is extended or adjusted under 35 U.S.C. 154(b) by 0 days.

(21) Appl. No.: 15/811,135

(22) Filed: Nov. 13, 2017

(65) Prior Publication Data

US 2018/0065534 A1 Mar. 8, 2018

Related U.S. Application Data

(63) Continuation of application No. 15/338,893, filed on Oct. 31, 2016, now abandoned.

(60) Provisional application No. 62/379,296, filed on Aug. 25, 2016.

(51) Int. Cl.
*B60P 7/08* (2006.01)
*B63B 25/28* (2006.01)

(52) U.S. Cl.
CPC ............ *B60P 7/0892* (2013.01); *B63B 25/28* (2013.01); *B63B 2025/285* (2013.01)

(58) Field of Classification Search
CPC ... B60P 7/0892; B63B 25/28; B63B 2025/285

USPC ...... 410/30, 49, 50, 90, 91, 94, 95, 99, 121, 410/155; 206/453, 586; 224/403, 404, 224/42.33; 248/499, 500

See application file for complete search history.

(56) References Cited

U.S. PATENT DOCUMENTS

| 6,176,657 B1 * | 1/2001 | Romph ................. B60P 7/0892 410/121 |
| 2003/0206782 A1 * | 11/2003 | Toglia .................. B60P 7/0884 410/94 |

* cited by examiner

*Primary Examiner* — Stephen T Gordon
(74) *Attorney, Agent, or Firm* — Lewellyn Law, PLLC; Stephen Lewellyn

(57) ABSTRACT

A removable chock for securing coolers, storage bins, and tool boxes on boats, and cargo areas of vehicles and trailers and the like. The low-profile base mounts to any flat surface, and allows the chock to be installed and uninstalled from the base without the use of any tools. The chock can be removed from the base when not being used and the base remains installed. The low-profile design of the base greatly reduces the potential trip hazard, as well as offers an aesthetically pleasing appearance than a permanently installed chock.

8 Claims, 5 Drawing Sheets

REMOVABLE CHOCK

CROSS-REFERENCE TO RELATED APPLICATIONS

This application is a continuation of U.S. application Ser. No. 15/338,893, filed Oct. 31, 2016, which claims the benefit of U.S. provisional patent application Ser. No. 62/379,296 filed on Aug. 25, 2016, each of which are incorporated by reference herein in their entirety.

FIELD OF THE INVENTION

The present invention relates generally to a device for securing items, such as coolers, tool boxes, and storage containers, on flat surfaces of boats, cargo beds of motor vehicles and trailers.

BACKGROUND OF THE INVENTION

Devices that are currently used to secure items, such as coolers, tool boxes, and storage containers, are typically in the form of permanently mounted chocks.

These devices are typically installed using multiple screws to attach the chocks to the floor or cargo surface. They are generally in the form of a large "L" shaped chock, whereas, 4 of them are installed on a flat surface strategically located at the 4 outside corners of the item to be secured. Once installed, they are permanent and cannot be removed without removing the attachment screws, thereby exposing multiple holes in the surface they were attached too. The chocks can create a trip hazard, as well as become aesthetically unpleasing whenever the stored item is removed.

A solution to the problem would be a chock that is easily removable, when not being used.

SUMMARY OF THE INVENTION

Embodiments of the present invention address this problem by providing a two-piece base and chock assembly, whereas the chock can be easily removed when not being used to secure items. The base is L-shaped and has a very low profile and has provisions for the chock to be installed with interlocking features so it does not require the use of any tools. The base is first attached to the flat surface using multiple screws, but can also be installed by other means. The chock is also L-shaped. The chock is then installed to the base by simply sliding it into the channel provided in the base. The base and chock geometry is designed so that the two interlock and are held together without the use of any mechanical fasteners. Typically, a plurality of 4 embodiments are used at the location of the four outer corners of the item to be secured. When not in use, the chocks can be removed, and the low-profile base is remaines attached to the flat surface, thereby reducing a potential trip hazard and is aesthetically pleasing.

BRIEF DESCRIPTION OF THE DRAWINGS

The invention can be understood best by those with ordinary skill in the art, with reference to the following drawings, along with the detailed description.

DETAILED DESCRIPTION OF THE INVENTION

Figure 1:
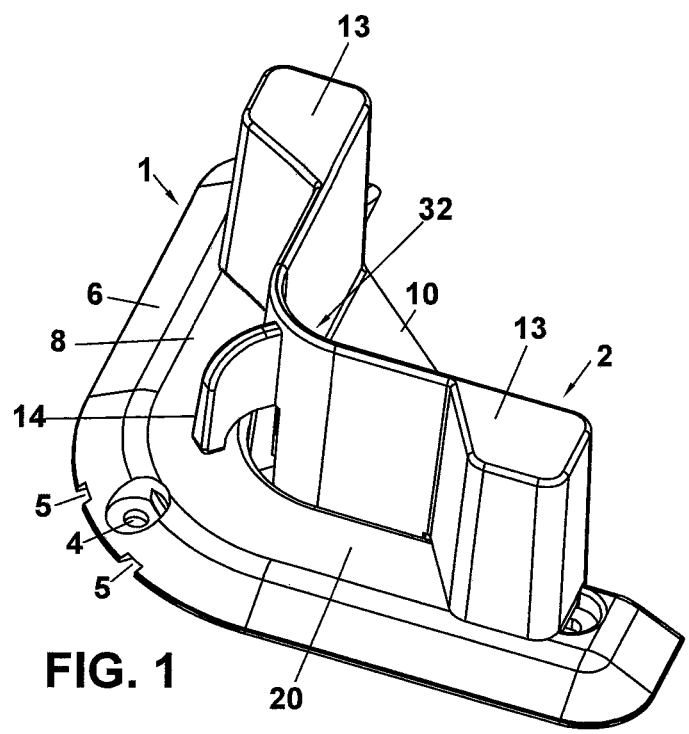
FIG. 1 illustrates a top perspective view of the embodiment shown assembled.

Referring to the drawings, details of the embodiment will be described herein.

Figure 2:
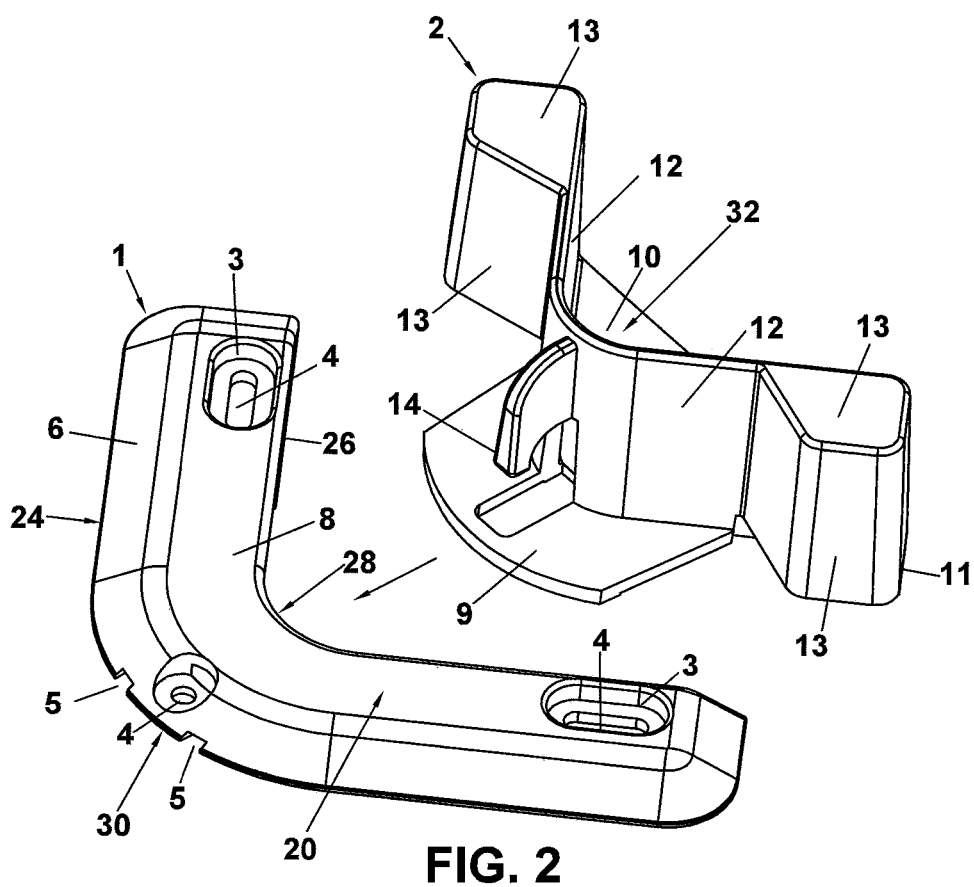
FIG. 2 illustrates an exploded top perspective view of the embodiment.
Figure 8:
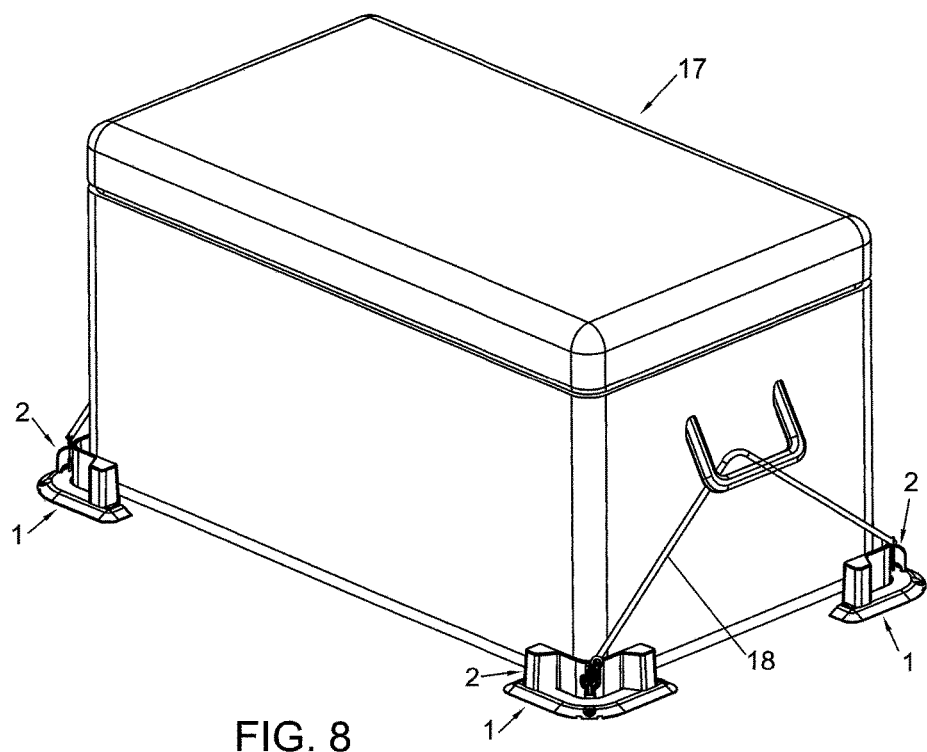
FIG. 8 illustrates the embodiments in one possible exemplary configuration for retaining a cooler.

Referring to FIGS. 1, 2 and 8, a plurality of the embodiment can be installed to help secure items, such as a cooler, tool box, or storage container 17 on a horizontal surface 16, such as a boat deck, vehicle or trailer cargo bed. The embodiment consists of a base 1 and a chock 2. First, the base 1 is installed on a horizontal surface 16 (specifics will be further explained later) then the chock 2 can be inserted into the base 1 allowing a means of retaining items, such as a cooler or storage container 17, in place on a horizontal surface 16.

Figure 9:
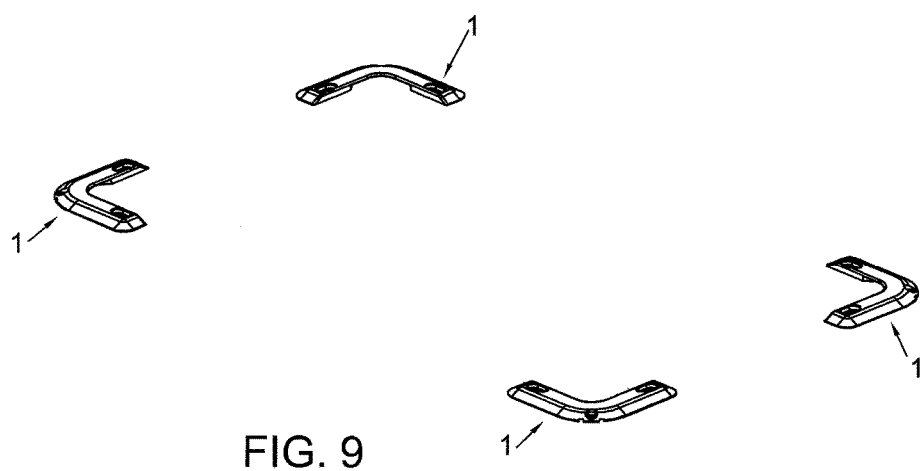
FIG. 9 illustrates the base embodiments with the chock embodiments uninstalled.

The base 1 has a low-profile surface 8 and a beveled edge surface 6 (see FIGS. 5, 6 and 7) and are intended to allow the base 1 from being an obstruction when the chock 2 is not installed (see FIG. 9) thereby reducing the risk of a potential trip hazard, as one example. The base is generally L-shaped and includes a top side 20, a bottom side 22, an outward side 24, an inward side 26, and interior (inside) corner 28, and an exterior corner 30.

Figure 3:
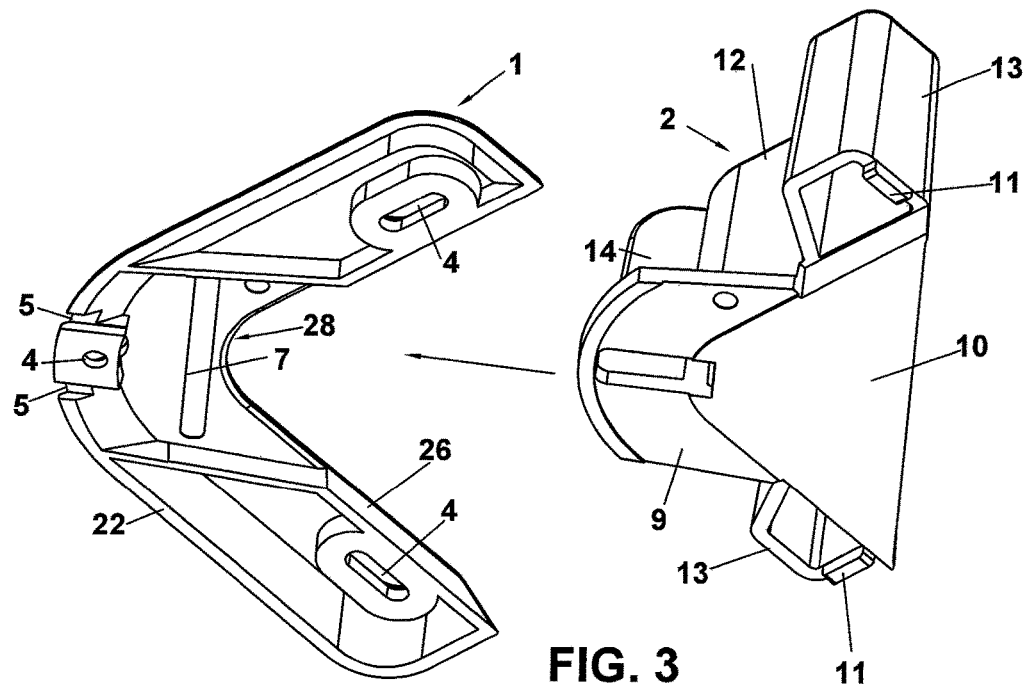
FIG. 3 illustrates a bottom perspective view of the embodiment shown exploded.
Figure 4:
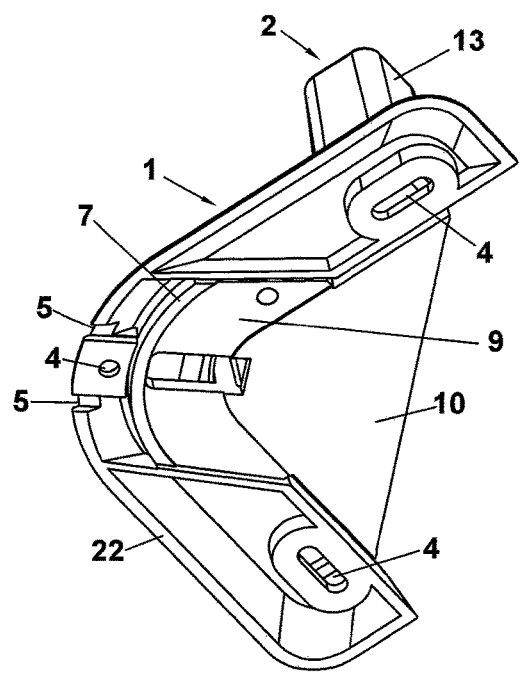
FIG. 4 illustrates a bottom perspective view of the embodiment shown assembled.

The base 1 has multiple mounting holes 4 (see FIGS. 2 and 3) for attaching to a horizontal surface 16, such as a boat deck or cargo bed. Mechanical fasteners 15 can be inserted through the mounting holes 4 and into the desired mounting surface 16 (see FIGS. 6 and 7) but other means of attachment are possible, without changing the spirit of the invention.

The chock 2, is designed to be inserted into the base 1 without the use of any tools. Chock 2 has an extended horizontal flange 9 which is inserted into an opposing channel 7 in the base 1. The flange 9 and channel 7 are designed to interlock and retain the chock 2 with the base 1 together when the chock is installed (see FIGS. 2, 3, 4, and 6)

Figure 5:
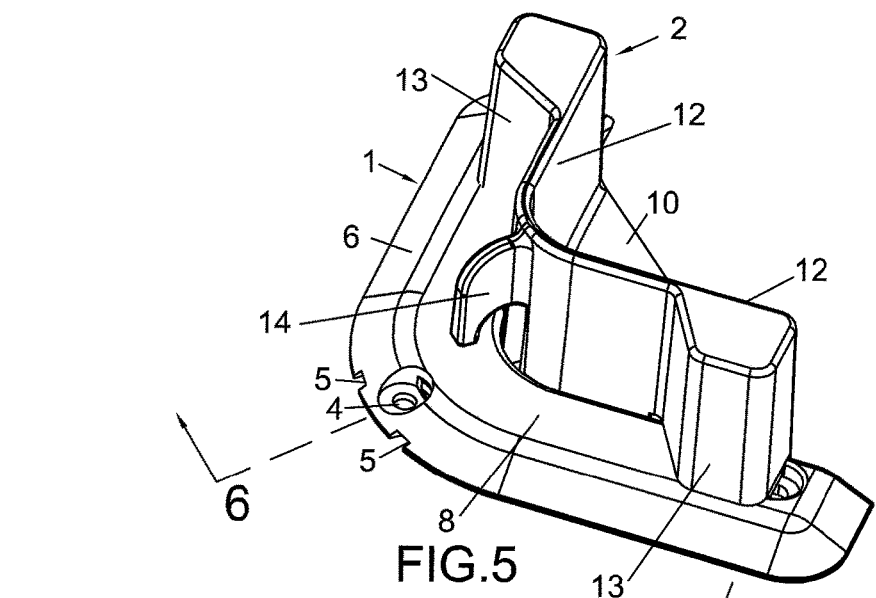
FIG. 5 illustrates a top perspective view of the embodiment including the sectional cut planes for FIGS. 6 and 7.
Figure 6:
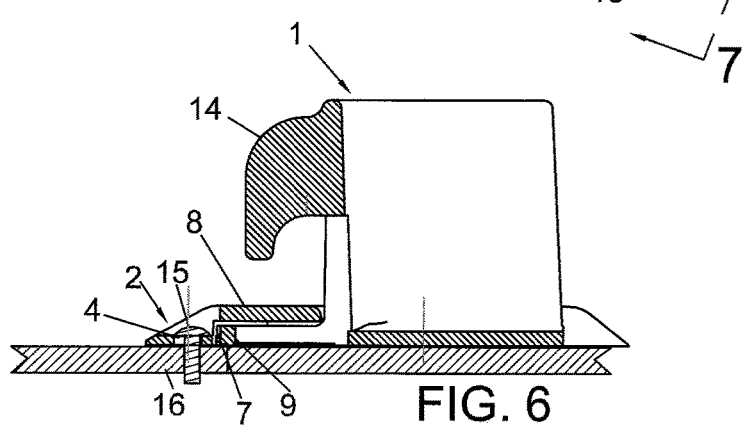
FIG. 6 illustrates a cross-sectional view taken along line 6 in FIG. 5 with the embodiment installed on a horizontal mounting surface.
Figure 7:
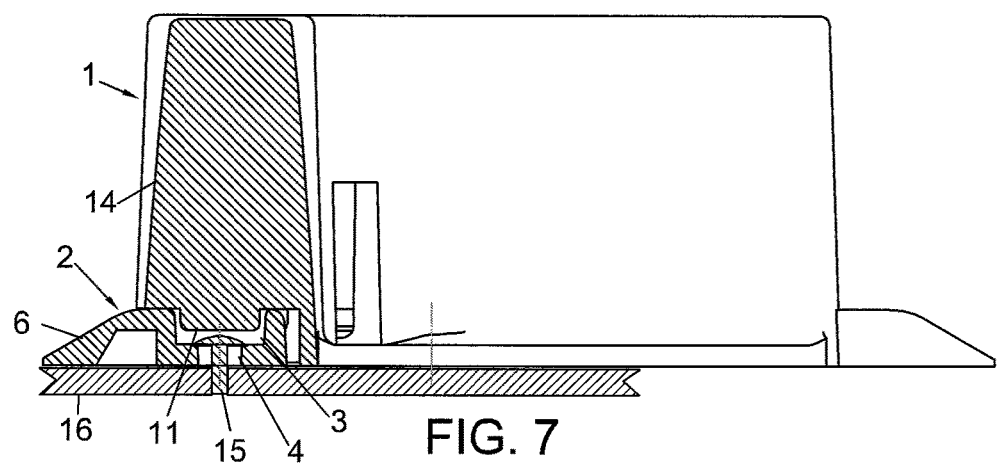
FIG. 7 illustrates a cross-sectional view taken along line 7 in FIG. 5 with the embodiment installed on a horizontal mounting surface.

To further retain the base 1 and chock 2 from disengaging, recessed depressions 3 in the base 1 and vertical ribs 11 on the chock 2 lock together when the chock 2 is inserted into the base 1 (see FIGS. 5 and 7). Again, no tools are necessary for installing or uninstalling the chock 2 into the base 1.

The chock 2 has two adjacent vertical surfaces (walls) 12 (see FIGS. 2 and 8) that are connected together and create an inside corner 32 for the purpose of retaining items in place. Column type shapes 13 are adjacent the ends of the chock 2 vertical wall surfaces 12 (see FIG. 2) which add rigidity to the vertical surfaces, but are not required for the spirit of the invention.

The chock 2 also has a hook feature 14 (see FIGS. 1, 6, and 8) extending from the intersection of the adjacent vertical wall surfaces 12, allowing an additional means for securing the stored item by attaching a tie down, such as a bungee cord of rope and the like.

The base 1 has longitudinal channels 5 (see FIGS. 2 and 3) located underside extending from the interior corner 28 to the exterior corner 30, thereby allowing water, or other liquids, to drain and not be trapped in the channel 7.

The chock 2 also has a horizontal web surface 10, joining the bottom of the vertical wall surfaces 12 further adding further rigidity to the chock.

The embodiments of the present invention have been described. Nevertheless, it will be understood that various modifications may be made without departing from the spirit and scope of the invention.

What is claimed is:

1. A removable chock assembly comprising:
   a base having an inward side defining a first inside corner and a channel formed through said inward side;
   a chock having a pair of vertical walls connected together and defining a second inside corner;
   said chock further having a flange extending from said pair of vertical walls in a direction opposite of said second inside corner; and
   said chock removably connected to said base with said chock disposed within said first inside corner and said flange disposed within said channel.

2. The removable chock assembly of claim 1, wherein:
   said chock further comprising vertical ribs depending downwardly therefrom;
   said base further comprising depressions formed through a top side of said base; and
   wherein said vertical ribs are removably received by said depressions when said chock is removably connected to said base and prevent said flange from being withdrawn from said channel.

3. The removable chock assembly of claim 1, wherein said chock further comprising an elongated downward facing hook attached to said pair of vertical walls on a side opposite of said second inside corner.

4. The removable chock assembly of claim 1, wherein said base further comprises drain channels formed through a bottom side of said base.

5. The removable chock assembly of claim 1, wherein said chock further comprises a web extending between said pair of vertical walls and across said second inside corner.

6. The removable chock assembly of claim 1, wherein said chock further comprises vertical columns extending adjacent to said pair of vertical walls, thereby providing rigidity to each vertical wall of said pair of vertical walls.

7. The removable chock assembly of claim 6, wherein:
   said chock further comprising a vertical rib depending downwardly from each vertical column;
   said base further comprising depressions formed through a top side of said base; and
   wherein said vertical ribs are removably received by said depressions when said chock is removably connected to said base and prevent said flange from being withdrawn from said channel.

8. The removable chock assembly of claim 1, wherein said base includes a plurality of holes extending therethrough for securing said base to a cargo surface using mechanical fasteners.

* * * * *